April 28, 1964
C. F. NASH
3,130,547
FLUID CONTROL DEVICE
Filed Sept. 27, 1962
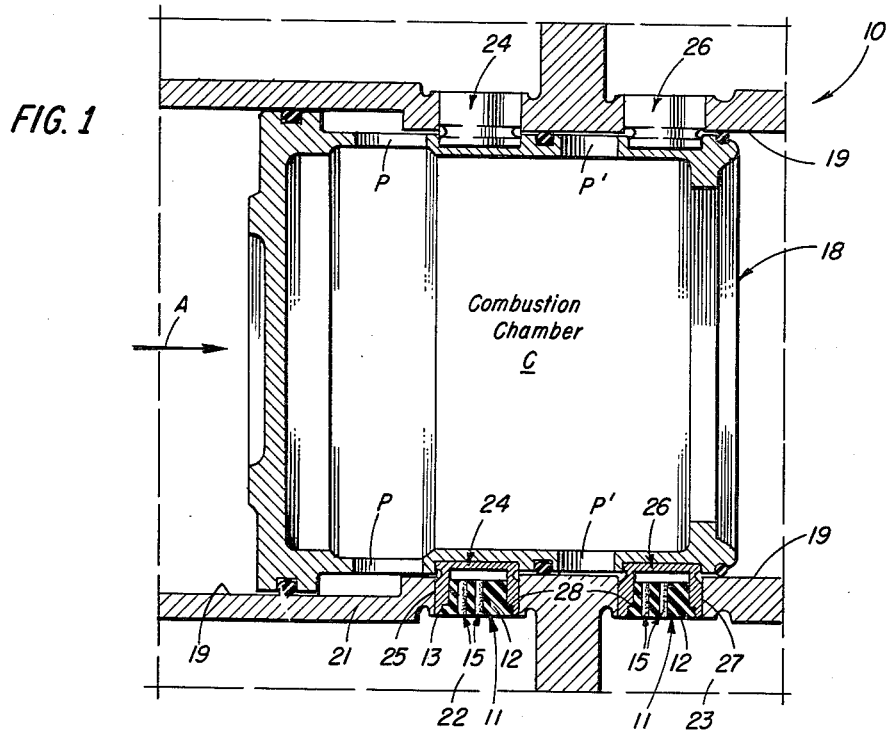
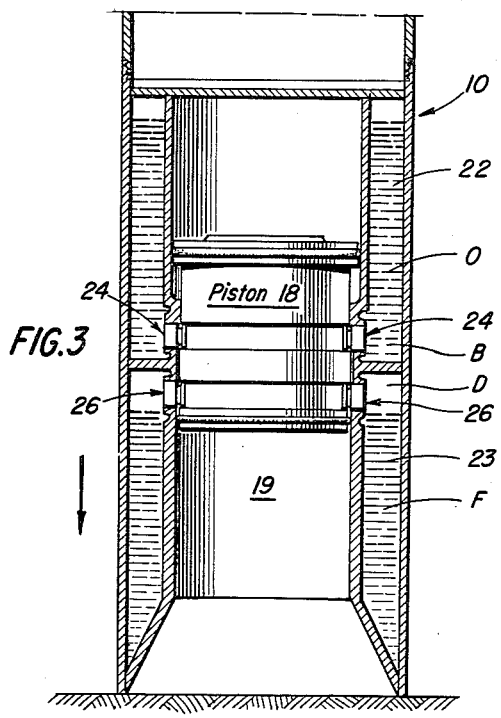
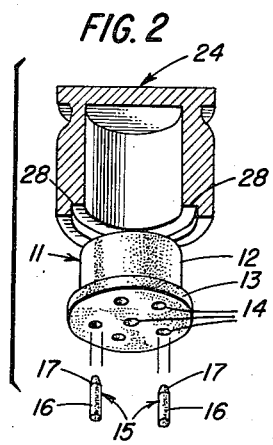
INVENTOR
CHARLES F. NASH
BY Claude Funkhouser.
ATTORNEY 3,130,547
FLUID CONTROL DEVICE
Charles F. Nash, Roseland, N.J., assignor to the United
States of America as represented by the Secretary of
the Navy
Filed Sept. 27, 1962, Ser. No. 227,667
1 Claim. (Cl. 60—39.48)

The present invention relates to fluid flow control means and more particularly to a new and improved pressure operated device suitable for use in a missile thrust unit.

More specifically the invention provides a sealing device for missile thrust units such, for example, as the type which employs a pressure operated shear slide for sealing the propellant orifices thereof and thus preventing flow and mixture of the propellants except during a normal firing operation.

By actual drop test of certain missiles containing such thrust units, it has been found that deflagration occurs when the unit is dropped a distance of forty feet. As a result of such tests it has been concluded that the deflagration is due to the high "G" loading on the slide thereby causing the slide to shear the shear cups thereupon allowing a mixing of the fuel and oxidizer. The oxidizer and fuel burn on contact and feed flames to the solid charge thereby igniting the charge which pressurizes the propellants causing propulsion of the missile, as is customary during a normal missile run or operation.

The present invention is constructed and arranged to overcome the aforesaid difficulties encountered in such devices by preventing flow and mixture of the aforesaid oxidizer and fuel should the shear cups be sheared by the slide prematurely or during a drop test.

Accordingly, an object of the invention is to provide a new and improved fluid flow control means suitable for use with a missile thrust unit.

Another object of the invention is to provide a pressure actuated sealing device for a missile thrust unit operable only during a normal missile firing operation.

Still another object of the invention is to provide a pressure responsive sealing device for maintaining the propellant orifices of a missile thrust unit in a sealed condition until a predetermined pressure is applied thereto.

A further object of the invention is to provide a pressure responsive sealing device for unsealing the propellant orifices of a missile thrust unit only during a normal missile firing operation and in response to a predetermined pressure applied thereto.

A still further object of the invention is the provision of a fluid flow control device for a missile thrust unit which is operable only when a normal missile firing operation occurs.

Other objects, advantages and novel features of the invention will become apparent from the following detailed description of the invention when considered in conjunction with the accompanying drawings wherein:

FIG. 1 is a fragmentary sectional view illustrating the device of the present invention in connection with a conventional missile thrust unit;

FIG. 2 is an exploded view in perspective illustrating the device of FIG. 1 and a shear cup used in connection therewith, the shear cup being shown in section; and FIG. 3 is a view in diagrammatical form illustrating the condition occurring should the unit be dropped on its aft end.

Referring to the drawings and more particularly to FIG. 1, there is shown a fragmentary portion of a missile thrust unit indicated generally by the numeral 10, which unit is one of the various types of units wherein the device or flow control element of the present invention may be used. The device or element 11 may be composed of any material suitable for the purpose such, for example, as plastic or metal, and comprises a cylindrical body portion 12 having a flange 13 formed at one end thereof. A plurality of orifices 14 are formed in and extend through the body and flange 13 and receive pressure-releasable plugs 15. The plugs 15 may be composed of either rubber, plastic or any other suitable material and comprises a cylindrical portion 16 terminating in a starting taper 17 at one end thereof so that the plugs may be readily press-fitted into the orifices 14 in such a manner that they will not become loosened with thermal growth of the orifices.

For a brief description of the thrust unit 10 and a better understanding of the operation thereof, it will be noted the unit comprises a shear slide or piston 18 slidably arranged within a bore 19 formed in a fixed member or center header 21, the shear slide being pressure operated during a normal firing operation and is also responsive to a drop test or to an accidental drop during handling. The slide is adapted to be moved in a direction, as indicated by arrow A, under the aforesaid conditions. The header 21 carries a shear cup 24 disposed in an opening 25 in communication with the oxidizer tank 22, and a shear cup 26 disposed in an opening 27 in communication with the fuel tank 23, each of the cups 24 and 26 carrying one of the elements 11. The slide 18 is provided with ports P and P′, the ports P being adapted to be moved into registration with openings 25 and, concurrently therewith, ports P′ to be moved into registration with openings 27 upon shearing of the cups 24 and 26, by the slide as the slide is actuated under normal conditions or in response to a severe shock.

In practice an element 11 is disposed and secured within each of the cups 24 and 26 in sealing engagement therewith, the flange 13 thereof being in abutting and sealing engagement with a shoulder 28 on each cup and the plugs 15 pressed into and in sealing engagement with the walls defining the orifice 14 in element 11.

By this arrangement a positive seal is provided between the oxidizer tank 22 and the combustion chamber C in slide 18, and between the fuel tank 23 and the chamber C, and thus fluid flow from the oxidizer and fuel tanks into the combustion chamber will not occur in the event that the slide 18 is moved prematurely in response to a sudden shock an amount sufficiently to shear the cups 24 and 26 since neither of the tanks are pressurized at this time. It will be understood that the tanks 22 and 23 may be pressurized in any suitable manner such, for example, as by a gas generator or the like. However, during an actual firing operation such, for example, as when the aforesaid tanks 22 and 23 are pressurized the plugs 15 will be expelled from elements 11 by the pressure in the tanks thereby allowing normal propellant flow from the tanks into the chamber C. It will be understood that the oxidizer and fuel ignite and burn upon contact in the chamber C, feeding flames back to the conventional solid charge thereby igniting the charge which pressurizes the propellants causing a normal missile propulsion operation.

Referring now to FIG. 3 which is a diagrammatical view illustrating the operational characteristics of the flow control elements 11 in the event that the unit 10 is dropped on its aft end. When this occurs, pressure builds up in the oxidizer tank 22 around elements 11, as at B, tending to expel the plugs 15 therein, which is due to the inertia of the fluid 0 in tank 22. It will be apparent that even though the cups 24 in tank 22 have been sheared and the plugs 15 in elements 11 have been expelled therefrom by the aforesaid pressure built up in tank 22 and cups 26 in tank 23 also been sheared, the plugs 15 in elements 11 therein will remain intact, since there is no pressure build-up around the elements 11, as at D, due to the inertia of fuel F in the fuel tank 23. This, therefore, insures no mixing and igniting of the oxidizer and fuel in combustion chamber C and thus a non-explosive condition is maintained and premature operation is prevented. Similarly, in the event that the unit 10 is dropped on its forward end, the plugs 15 in elements 11 in the fuel tank 23 may be expelled. However, the plugs 15 in elements 11 in the oxidizer tank 22 will remain intact. From the aforesaid construction and arrangement, it will be apparent that regardless of the direction of shock only one propellant at a time may be released and actual release of both the fuel and oxidizer will occur only during a normal propulsion operation, such, for example, when pressure is present in both the oxidizer and fuel tanks.

While the plugs 15 may be composed of any material suitable for the purpose, the plugs in the elements 11 in the fuel tank 22 are preferably formed "Butyl" rubber, the plugs in the elements 11 in the oxidizer tank 23 being preferably formed of elastomeric "Kel–F–5500."

From the foregoing it will be apparent that novel flow control means have been devised for a missile thrust unit wherein means are provided for preventing premature mixing and ignition of the propellants until a normal and actual firing condition prevails.

Obviously, many modifications and variations of the present invention are possible in the light of the above teachings. It is, therefore, to be understood that within the scope of the appended claim the invention may be practiced otherwise than as specifically described.

What is claimed is:

In a fluid seal for use in a missile thrust unit, the combination of a fixed header having a cylindrical bore therein, a pressure actuated piston slidably disposed within said bore and having a combustion chamber therein, said piston being movable from an initial position to an operating position, a pair of normally depressurized tanks carried by said header, a quantity of combustible fluid sealed within said tanks, shearable cups carried by said header and disposed in each of said tanks and sheared as the piston moves from said initial position to said operating position a core element secured in sealing engagement within each shearable cup, said cores having a plurality of bores disposed therethrough, a plurality of pointed plugs being press-fitted into the bores of the cores associated with the shearable cups disposed in the first of said pair of normally depressurized tanks, a plurality of pointed plugs being press-fitted into the bores of the cores associated with the shearable cups disposed in the second of said pair of normally depressurized tanks, said pointed plugs being deposed from said core elements when the tank with which said pointed plugs are associated is in a pressurized condition, and port means in said piston for establishing communication between said pair of normally depressurized tanks and said combustion chamber when said piston is in said operating position and the respective tanks are pressurized so as to depose said pointed plugs from said core elements.

References Cited in the file of this patent

UNITED STATES PATENTS 3,094,837     Sherman et al. _____ June 25, 1963